(12) United States Patent
Saado

(10) Patent No.: US 11,550,101 B2
(45) Date of Patent: Jan. 10, 2023

(54) PHOTONIC DEVICE HAVING A PHOTONIC CRYSTAL LOWER CLADDING LAYER PROVIDED ON A SEMICONDUCTOR SUBSTRATE

(71) Applicant: Micron Technology, Inc., Boise, ID (US)

(72) Inventor: Yuval Saado, Jerusalem (IL)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/509,846

(22) Filed: Oct. 25, 2021

(65) Prior Publication Data

US 2022/0043206 A1 Feb. 10, 2022

Related U.S. Application Data

(63) Continuation of application No. 16/925,675, filed on Jul. 10, 2020, now Pat. No. 11,156,775, which is a continuation of application No. 13/927,306, filed on Jun. 26, 2013, now Pat. No. 10,718,901.

(51) Int. Cl.
*G02B 6/122* (2006.01)

(52) U.S. Cl.
CPC .................................. *G02B 6/1225* (2013.01)

(58) Field of Classification Search
CPC .................................................... G02B 6/1225
See application file for complete search history.

(56) References Cited

U.S. PATENT DOCUMENTS

| | | | |
|---|---|---|---|
| 5,533,151 A | 7/1996 | Leonard | |
| 5,682,455 A | 10/1997 | Kovacic et al. | |
| 5,841,930 A | 11/1998 | Kovacic et al. | |
| 5,917,981 A | 6/1999 | Kovacic et al. | |
| 6,640,034 B1 | 10/2003 | Charlton et al. | |
| 6,674,949 B2 | 1/2004 | Allan et al. | |
| 6,768,828 B2 | 7/2004 | Gill et al. | |
| 6,778,746 B2 | 8/2004 | Charlton et al. | |
| 6,901,194 B2 | 5/2005 | Charlton et al. | |
| 6,993,212 B2 | 1/2006 | Block et al. | |
| 7,039,288 B2 | 5/2006 | Wang et al. | |
| 7,043,106 B2 | 5/2006 | West et al. | |
| 7,158,711 B2 | 1/2007 | Tokushima | |
| 7,298,949 B2 | 11/2007 | Gothoskar et al. | |
| 7,418,161 B2 | 8/2008 | Mouli | |
| 7,421,179 B1 | 9/2008 | Jiang et al. | |
| 7,507,634 B2 | 3/2009 | Sato et al. | |

(Continued)

FOREIGN PATENT DOCUMENTS

| | | |
|---|---|---|
| CN | 1670481 A | 9/2005 |
| CN | 1717612 A | 1/2006 |

(Continued)

OTHER PUBLICATIONS

CN Patent Application No. 201480036559.8—Chinese Office Action and Search Report, with English Translation, dated May 18, 2017, 23 pages.

(Continued)

*Primary Examiner* — Andrew Jordan
(74) *Attorney, Agent, or Firm* — Perkins Coie LLP

(57) ABSTRACT

An integrated photonic device is provided with a photonic crystal lower cladding on a semiconductor substrate.

20 Claims, 6 Drawing Sheets

(56) References Cited

U.S. PATENT DOCUMENTS

| | | |
|---|---|---|
| 7,555,173 B2 | 6/2009 | Barrios et al. |
| 7,603,016 B1 | 10/2009 | Soref |
| 7,820,970 B1 | 10/2010 | Shaw et al. |
| 7,907,848 B1 | 3/2011 | Soref |
| 8,115,854 B2 | 2/2012 | Mouli |
| 8,765,575 B2 | 7/2014 | Benoit et al. |
| 9,459,405 B2 | 10/2016 | Czornomaz et al. |
| 9,653,306 B2 * | 5/2017 | Shimoda ........... H01L 21/28518 |
| 10,718,901 B2 | 7/2020 | Saado |
| 2002/0021878 A1 | 2/2002 | Allan et al. |
| 2002/0105000 A1 | 8/2002 | Abe |
| 2002/0136518 A1 | 9/2002 | Wang et al. |
| 2003/0174940 A1 | 9/2003 | Charlton et al. |
| 2004/0087049 A1 | 5/2004 | Gill et al. |
| 2004/0156610 A1 | 8/2004 | Charlton et al. |
| 2004/0173798 A1 * | 9/2004 | Forbes .................... H01L 29/78 257/69 |
| 2005/0054199 A1 | 3/2005 | Block et al. |
| 2005/0089257 A1 | 4/2005 | Barrios et al. |
| 2005/0281524 A1 | 12/2005 | Mouli |
| 2006/0051016 A1 | 3/2006 | Ogawa et al. |
| 2006/0093299 A1 | 5/2006 | Ogawa et al. |
| 2006/0104586 A1 | 5/2006 | Tokushima et al. |
| 2007/0104442 A1 | 5/2007 | Nobayashi et al. |
| 2008/0003771 A1 | 1/2008 | Sato et al. |
| 2009/0087137 A1 | 4/2009 | Doan |
| 2010/0142877 A1 | 6/2010 | Barrios et al. |
| 2010/0164045 A1 | 7/2010 | Mouli et al. |
| 2013/0005606 A1 | 1/2013 | Chen et al. |
| 2013/0288450 A1 | 10/2013 | Benoit et al. |
| 2015/0003775 A1 | 1/2015 | Saado |
| 2015/0086219 A1 | 3/2015 | Li et al. |
| 2016/0018596 A1 | 1/2016 | Czornomaz et al. |
| 2017/0170805 A1 | 6/2017 | Wang et al. |
| 2017/0192170 A1 | 7/2017 | Baudot et al. |
| 2020/0341195 A1 | 10/2020 | Saado |
| 2022/0043206 A1 * | 2/2022 | Saado .................. G02B 6/1225 |

FOREIGN PATENT DOCUMENTS

| | | |
|---|---|---|
| JP | 11271541 A | 10/1999 |
| JP | 2002189135 A | 7/2002 |
| JP | 2002323633 A | 11/2002 |
| JP | 2003149481 A | 5/2003 |
| JP | 2004527778 A | 9/2004 |
| JP | 2005091467 A | 4/2005 |
| JP | 2008209450 A | 9/2008 |
| WO | 0214915 A2 | 2/2002 |

OTHER PUBLICATIONS

CN Patent Application No. 201480036559.8—Chinese Office Action, dated Apr. 4, 2019, with English Translation, 16 pages.

CN Patent Application No. 201480036559.8—Chinese Office Action, dated Sep. 18, 2019, with English Translation, 17 pages.

CN Patent Application No. 201480036559.8—Chinese Office Action, with English Translation, dated Dec. 19, 2018, 16 pages.

Int'l Application No. PCT/US2014/042496—International Search Report and Written Opinion, dated Oct. 13, 2014, 16 pages.

JP Patent Application No. 2016-500463—Japanese Office Action, dated Aug. 15, 2017, with English Translation, 5 pages.

KR Patent Application No. 10-2016-7002133—Korean Office Action and Search Report, with English Translation, dated Jul. 3, 2017, 22 pages.

Office Action dated Aug. 25, 2015 in Taiwan App. No. 103122143, 19 pages.

TW Patent Application No. 103122143—Taiwanese Office Action and Search Report, dated Jul. 3, 2017, with English Translation, 16 pages.

TW Patent Application No. 107102445—Taiwanese Office Action and Search Report, dated Sep. 20, 2018, with English Translation, 11 pages.

"Extended European Search Report dated Jan. 12, 2017 in Eiropean Application No. 14817864.3, 9 pages."

"M.A. Kaliteevsky et al. "Disorder in 2D Photonic Crystals: Modifications of Transmission and Photonic Minibands", 0-7803-7982-9/03/$17.00, pp. 85-86, IEEE."

"Marian Florescu et al., "Complete Band Gaps in Two-Dimensional Photonic Quasicrystals", The American Physical Society, B 80, pp. 155112-1 to 15112-7, 2009."

"Office Action dated Apr. 21, 2016 in Taiwan Application No. 103122143, 19 pages."

"Office Action dated Jan. 31, 2017 in Japan Application No. 2016-523782, 6 pages."

"Office Action dated Sep. 20, 2016 in Taiwan Application No. 103122143, 5 pages."

"Xiwen Sun et al., "Air Guiding with Photonic Quasi-Crystal Fiber", IEEE Photonics Technology Letters, vol. 22, No. 9, May 1, 2010."

* cited by examiner

PHOTONIC DEVICE HAVING A PHOTONIC CRYSTAL LOWER CLADDING LAYER PROVIDED ON A SEMICONDUCTOR SUBSTRATE

CROSS-REFERENCE TO RELATED APPLICATIONS

This application is a continuation of U.S. application Ser. No. 16/925,675, filed Jul. 10, 2020, which is a continuation of U.S. application Ser. No. 13/927,306, filed Jun. 26, 2013, now U.S. Pat. No. 10,718,901, which are incorporated herein by reference in their entirety.

FIELD OF THE INVENTION

The present invention relates to photonic devices fabricated over semiconductor substrates.

BACKGROUND OF THE INVENTION

Photonic devices such as waveguides, modulators, detectors, demodulators, resonators, taps, splitters, amplifiers, gratings, couplers, and others, have been successfully integrated on an integrated circuit substrate. Typically, photonic devices have a waveguide core material for channeling light and a cladding surrounding the core for confining the light in the core. Often the substrate is formed of silicon and the core material is formed of polysilicon. When such devices are fabricated on a substrate there must also be a decoupling of the light passing through the core from being coupled to the substrate to prevent optical signal loss. This requires a suitable optical decoupler between the core and substrate. Often a silicon on insulator (SOI) substrate, having an optical insulator in the form of a silicon dioxide layer beneath a silicon upper layer can be used for this purpose. Alternatively, a bare silicon substrate can be provided with an overlying optical decoupler, for example, a silicon dioxide layer, on which photonics devices having a waveguide core can be built. In addition, the current trend is to integrate electronic circuits, and devices on a substrate together with photonics circuits and devices. This presents additional problems as a substrate having suitable optical isolation used for photonics devices and circuits may be unsuitable for desired operating characteristics for electronic devices and circuits fabricated on the same substrate.

An efficient technique and structure for optically isolating photonics circuits and devices from a substrate, while providing a suitable cladding layer and low signal loss, and allowing for ease of integration of electronic circuits and devices on the same substrate is desired.

DETAILED DESCRIPTION OF THE INVENTION

The invention provides an optical isolation structure, which can isolate a photonic device such as a waveguide, or other photonic device which includes a waveguide as part of its structure, from the bulk material of an underlying substrate. The optical isolation structure also serves as a lower cladding for vertical confinement of light passing through the photonic device. The optical isolation structure is formed of a photonic crystal fabricated in the substrate over which the remainder of a photonic device is formed. The photonic device includes a waveguide having a core optically isolated from the substrate by the photonic crystal lower cladding layer. Additional cladding is also provided on the sides and over the top of the waveguide core.

The photonic device may be integrated on a substrate on which both photonic devices and electrical devices are formed.

Although embodiments will be described employing a silicon substrate and crystalline silicon as a core material for a waveguide, the embodiments are not limited to use of these specific materials as other materials can be used for the substrate and waveguide core.

Figure 1A:
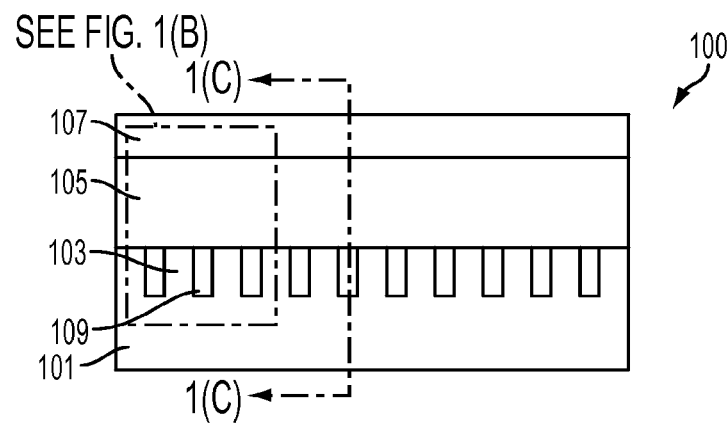
FIG. 1(A) is a cross-sectional view of an example of a photonic device, along the waveguiding direction, fabricated on a substrate in accordance with one embodiment.
Figure 1B:
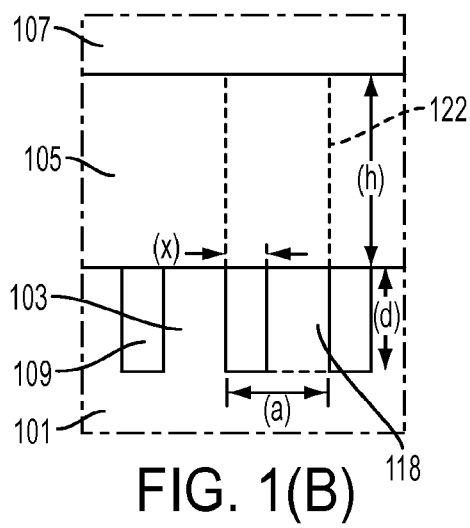
FIG. 1(B) is an enlarged portion of the FIG. 1(A) embodiment showing representative dimensions.
Figure 1C:
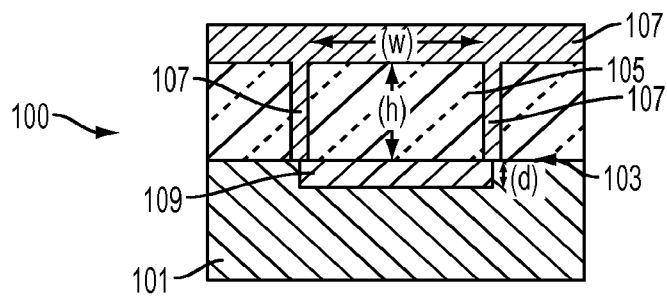
FIG. 1(C) is a cross-sectional view of the FIG. 1(A) embodiment, rotated by 90°, and along the perpendicular plane of the waveguiding direction.

Referring now to the cross-sectional views of FIG. 1(A) and FIG. 1(C), the latter being a 90° rotated view of FIG. 1(A), and FIG. 1(B) which is an enlarged portion of FIG. 1(A), one embodiment of a photonic device 100 formed on a silicon substrate 101 is shown. The photonic device 100 shown is a waveguide having a waveguide core 105, a lower cladding formed by a photonic crystal 103 formed in substrate 101 and, as shown in FIG. 1(C), sidewall cladding and upper cladding formed by a dielectric material 107. The direction of light passage through core 105 in FIG. 1(A) is left to right or right to left. The photonic device can be formed as any type of photonic device which uses a waveguide core 105 to pass light. Examples include, waveguides, modulators, detectors, demodulators, resonators, taps, splitters, amplifiers, gratings, couplers, and other photonic devices. The coupling between the optical guide modes in the waveguide core 105 and the silicon substrate 101 modes is inhibited by the crystal dispersion properties of the photonic crystal 103 thereby providing a low loss light path through waveguide core 105.

The photonic crystal 103 is provided as a periodic or quasi-periodic array of elements 109 formed in the substrate 101. As a non-limiting example, the substrate 101 may be formed of bare silicon that is, silicon is the only material through the entire substrate 101 thickness. The elements 109 may be formed of various dielectric or conductive materials, such as an oxide (silicon oxide, silicon dioxide), a nitride, such as silicon nitride, or a metal such as aluminum or copper, as examples. Indeed, any material which breaks the substrate 101 into periodic or quasi-periodic segments 118 (FIG. 1(B)) and which causes light dispersion can be used, as long as the average index of refraction of the photonic crystal 103 is lower than that of the material of waveguide core 105. The elements 109 cause dispersion of light entering into substrate 101 such that there is little or no coupling of light into the substrate 101 bulk. Also because the average refractive index of the photonic crystal 103 is lower than that of waveguide core 105, it serves as a lower cladding for a waveguide which includes the core 105, and side and upper cladding 107, best shown in FIG. 1(C). FIG. 1(B) shows by dotted lines one of the successive waveguide segments 122, which includes a photonic crystal 100 segment 118, in which the waveguide core 105 has a height (h), the elements 109 have a width (x) and a depth (d) into the substrate 101, and the elements 109 are spaced with an average period (a). The depth (d) is less than the thickness of the substrate 101.

The average refractive index of the photonic crystal 103 is determined by averaging the refractive index of the photonic crystal 103 segment 118 having an average period (a) (FIG. 1(B)) or a quasi-period as described below. The waveguide core 105 can be formed of crystalline silicon, as one example, and the side and upper cladding 107 can be formed of a material having a lower refractive index than that of the crystalline silicon waveguide core 105. In one specific example of the FIG. 1(A)-1(C) embodiment, the substrate 101 is formed of bare silicon, the elements 109 are formed of silicon dioxide, the core 105 is formed of epitaxial crystalline silicon, and the side and upper cladding 107 is formed of silicon dioxide. In addition, as described further below, if electronic devices will also be integrated on substrate 101, the sides and upper cladding may be formed of BPSG or PSG, materials which are known to be useful as interlayer dielectric materials in electronic integrated circuits and which have an index of refraction lower than that of the crystalline silicon waveguide core 105.

As shown in FIGS. 1(A)-1(C), the photonic crystal 103 has a periodic structure of average period (a) (FIG. 1B); however the photonic crystal can also have a quasi-periodic crystal structure. Quasi-period photonic crystals are well known and are described, for example, in "Complete Band Gaps in Two-Dimensional Photonic Quasicrystals" by Florescu et al., The American Physical Society (2009) pages 155112-1 through 15512-7 and "Air Guiding with Photonic Quasi-Crystal Fiber" by Sun et al., IEEE (2010), 1041-1135.

In one example of a specific construction, and using the waveguide segment 122 dimensions shown in FIG. 1(B), the photonic crystal 103 is formed as a one dimensional (ID) Bragg reflector. The height (h) and width (w) of waveguide core 105 may respectively be approximately 3.3 um, and approximately 3× (h). A width to thickness ratio of ≥3:1 facilitates coupling of a light source, for example, to the photonic device 100. This asymmetrical design for the waveguide core 105 also supports the primary propagating zero order mode while supporting higher order modes. The width (x) of an element 109 can be approximately 0.13 um and the average period (a) can be approximately 0.54 um. The depth (d) of the elements 109 may be approximately 0.68 um. The word "approximately" is used herein to indicate that a value may deviate ±10% from the expressed value. With this construction the photonic crystal 103 has an average index of refraction of 3.4, which is less than that of crystalline silicon (3.5). In addition, since the width of the silicon of substrate 101 between elements 109 is approximately 0.41 um, which is more than three (3) times the width (w) of the elements 109, formation of an almost perfect crystalline epitaxial silicon layer for waveguide core 105 above substrate 101 is facilitated.

Simulations done on a waveguide having these dimensions show that the geometrical properties of the photonic crystal 103 and waveguide core 105 can be minimally adjusted to achieve minimal transmission loss for $TE_{01}$ and $TM_{01}$ propagating modes, at a wavelength of 1310 nm±40 nm. There is low optical signal loss into the substrate 101 of approximately −2 db/cm to approximately −5 db/cm. The simulations also reveal that the height (h) (FIG. 1(B)) of the waveguide core layer 105 should be larger than approximately 2.5 um for $TE_{01}$ mode transmission and larger than approximately 5 um for $TM_{01}$ mode transmission.

The parameters discussed above are but examples of representative dimensions for a waveguide core 105 and associated photonic crystal cladding 103. Other dimensions can be used as well for a particular application.

Although the embodiment described above and illustrated in the drawings forms a one dimensional photonic crystal 103 acting as a Bragg reflector, the photonic crystal 103 can also be formed as a two dimensional or three dimensional photonic crystal structure within substrate 101. Two and three dimensional photonic crystals 103 can further lower optical signal loss into substrate 101 and improve the ability of the photonic device 100 to support TE and TM optical transmission modes.

One example of a process for forming the FIG. 1(A)-1(C) structure will now be described with reference to FIGS. 2(A) through 2(H).

Figure 2A:
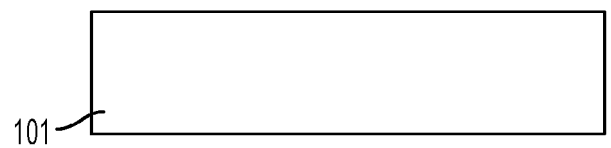
FIGS. 2(A) through 2(H) depict an example of the successive steps of a fabrication process for forming the FIG. 1A embodiment.
Figure 2B:
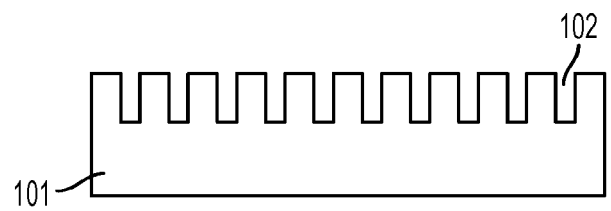
Figure 2C:
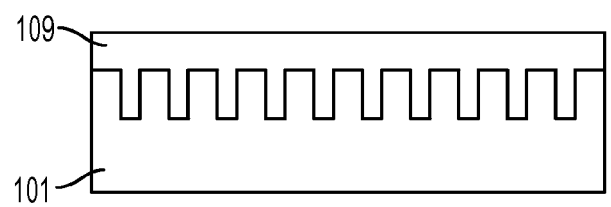
Figure 2D:
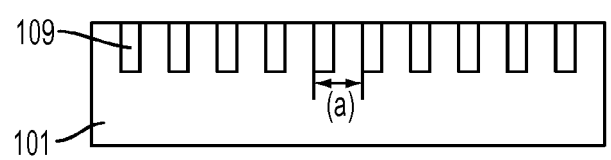

FIG. 2(A) illustrates a starting substrate 101 which is bare silicon substrate. The substrate 101 is patterned with a plurality of trenches 102 using photolithography. In one example, a patterned mask, e.g., a silicon nitride mask, is formed above substrate 101 with portions of the mask corresponding to locations of elements 109 removed down to the surface of substrate 101. As shown in FIG. 2(B) the removed areas of the mask allow for a selective etch of substrate 101 to form trenches 102, after which the mask is removed by etching or chemical mechanical polishing (CMP) and substrate 101 cleaning. Then, as shown in FIG. 2(C), an oxide, e.g., silicon dioxide 109 is deposited or grown over substrate 101 filling trenches 102. As shown in FIG. 2(D), the silicon dioxide is then planarized down to the upper level of substrate 101 to form the elements 109 which are embedded in substrate 101. The elements 109 are arranged at an average period (a).

Figure 2E:
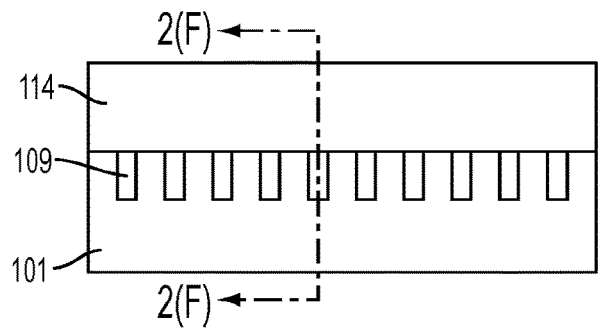
Figure 2F:
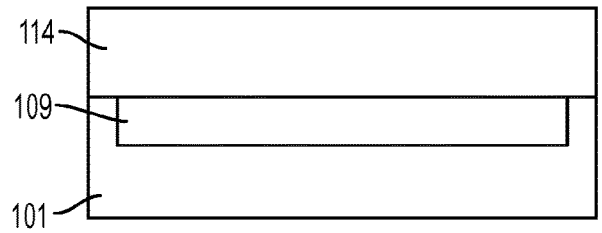

As shown in FIG. 2(E) a crystalline silicon layer 114 which will form waveguide core 105 is non-selectively epitaxial grown as a blanket layer over substrate 101 containing the oxide elements 109. FIG. 2(F) shows a cross-section of the substrate 101 rotated 90° from FIG. 2(E). Since the width (x) of the element 109 is small (0.13 um), a small amount of polysilicon will be formed over oxide elements 109 during the epitaxial growth. However, the polysilicon will be thinner than 0.2 um and hence its effective volume will be less than 1% of the total volume of the essentially perfect epitaxial crystalline layer 114 which will form waveguide core 105.

Figure 2G:
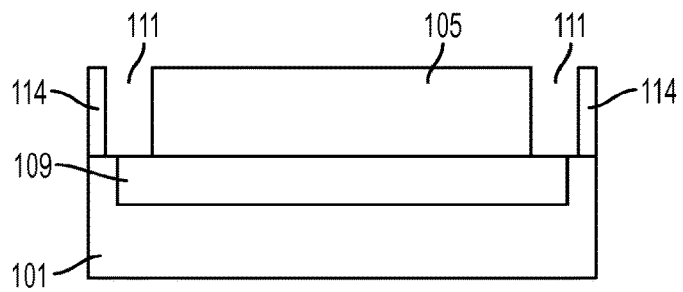
Figure 2H:
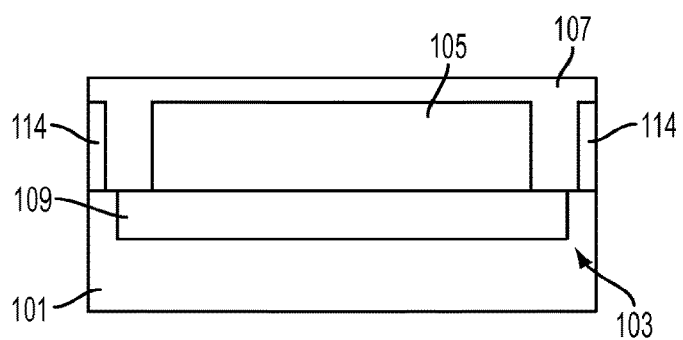

As shown in FIG. 2(G) the crystalline epitaxial silicon layer 114 is selectively etched to form trenches 111 to the top of the photonic crystal 103 at the surface of substrate 101 thereby forming a waveguide core 105, which is separated by trenches 111 from other epitaxial crystalline silicon areas 114. Then, as shown in FIG. 2(H) a dielectric material is deposited to form the side and upper cladding layers 107 for the waveguide core 105. The dielectric material for side and upper cladding layers can be any material having an index of refraction lower than silicon and can be an oxide, for example, silicon dioxide, or a nitride, BPSG, PSG, or other material. In one example, the photonic device 100 has a waveguide structure which includes crystalline silicon waveguide core 105, a lower photonics crystal cladding 103, and side and upper silicon dioxide cladding 107.

An alternative process for forming the photonic crystal 103 and associated photonic device 100 is shown in FIGS. 3(A)-3(H).

Figure 3A:
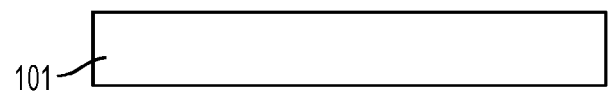
FIGS. 3(A) through 3(H) depict an example of the successive steps of another fabrication process.
Figure 3B:
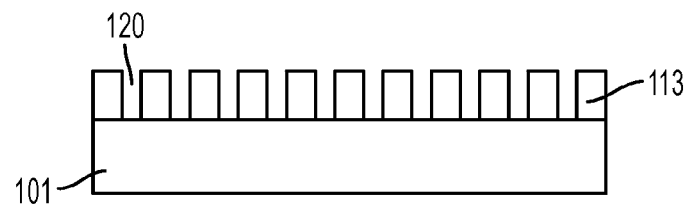
Figure 3C:
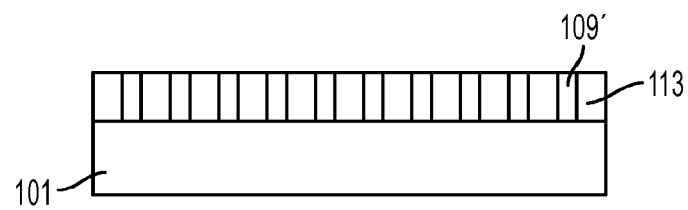
Figure 3D:
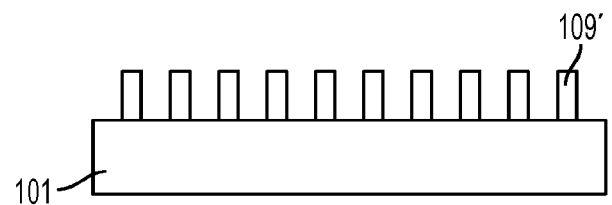
Figure 3E:
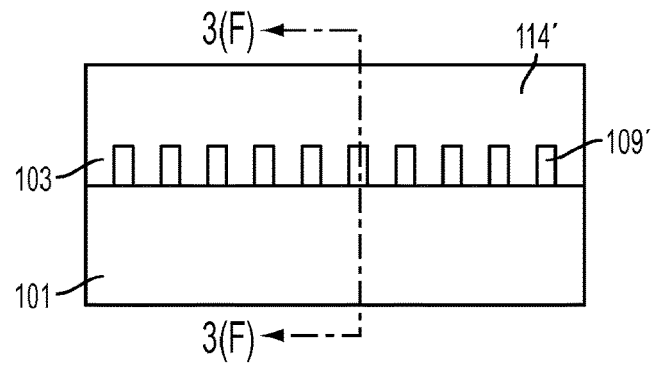

FIG. 3(A) shows the starting bare silicon substrate 101. FIG. 3(B) shows a patterned mask 113 formed over the substrate 101. The patterned mask 113 can be formed of silicon nitride. The openings 120 in the mask 113 correspond to locations where the elements 109' of the photonic crystal structure 103 will be formed. As shown in FIG. 3(C) the elements 109' are fabricated in the openings 120 using an oxide e.g., silicon dioxide, and then a CMP planarization of the silicon dioxide to the top surface of the mask 113. Next, as shown in FIG. 3(D), the mask material is selectively etched away leaving elements 109' extending upwardly from the upper surface of substrate 101. As shown in FIG. 3(E) an epitaxial layer of crystalline silicon 114' is fabricated as a blanket layer over the upper surface of substrate 101 and extending upwardly past the upper ends of the elements 109'. The epitaxial crystalline silicon 114' will be formed into waveguide core 105 over the photonic crystal structure 103.

Figure 3F:
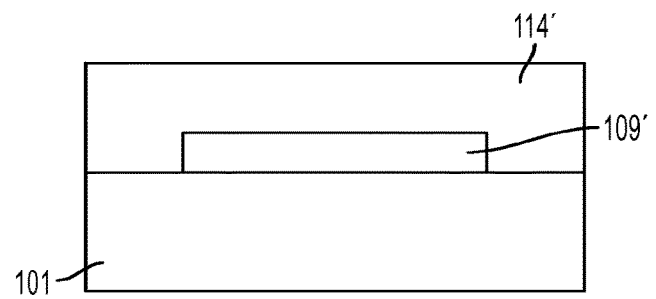
Figure 3G:
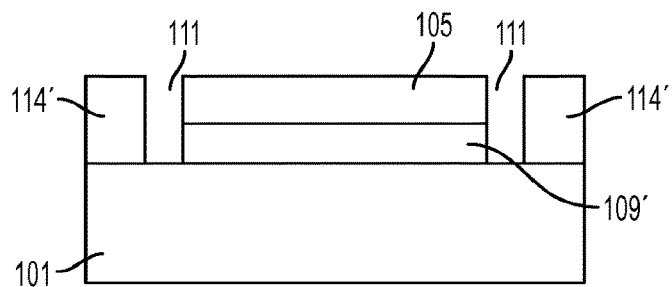
Figure 3H:
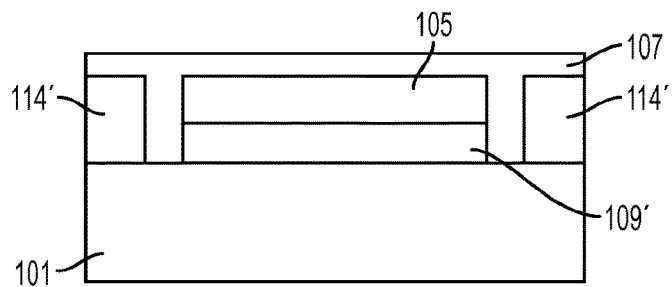

FIG. 3(F) is a 90° rotated cross-sectional view of the FIG. 3(E) structure. As shown in FIG. 3(G) the epitaxial crystalline silicon layer 114' is then etched selectively to the surface of silicon substrate 101 to form waveguide core 105, which is separated from other areas 114' of epitaxial crystalline silicon by trenches 111 and following this side and upper cladding dielectric material 107 is formed in the etched areas and over the upper surface of waveguide core 105. The dielectric material can be the same dielectric material 107 discussed above with respect to FIGS. 1(A)-1(C) and FIG. 2(H), e.g., silicon dioxide or one of the other materials discussed with reference to FIG. 2(H). This forms the completed waveguide 100 structure which includes the photonic crystal 103 lower cladding and silicon dioxide (or other material) side and upper cladding 107 surrounding the crystalline silicon waveguide core 105.

Figure 4:
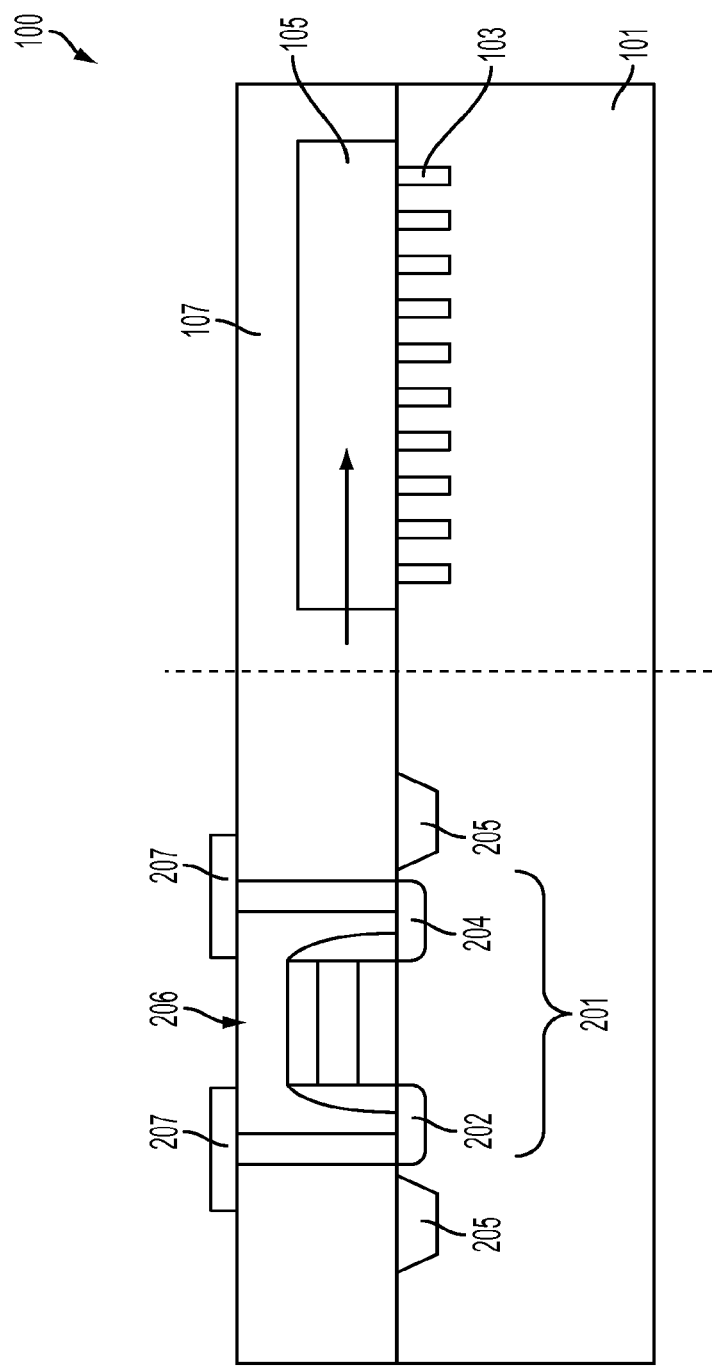
FIG. 4 is a cross-section of an integrated circuit fabricated to contain both photonic devices and electrical devices on the same substrate.

FIG. 4 illustrates an example of the integration of a photonic device 100 on the same substrate 101, e.g., a silicon substrate, on which electronic devices and circuits, e.g., CMOS devices and circuits, are fabricated. The right side of FIG. 4 illustrates the photonics device, including the photonic crystal 103 lower cladding, waveguide core 105, and side (not shown) and upper cladding 107 shown in the FIG. 1(A) embodiment. The left side of FIG. 4 illustrates fabrication of a MOSFET transistor 201 as an example of an electronic device forming part of an electronic circuit fabricated on bare silicon substrate 101. The MOSFET transistor 201 includes doped source 202 and drain 204 regions in the upper areas of silicon substrate 101, electrical shallow trench isolation (STI) regions 205 in substrate 101 around transistor 201, and a gate structure 206 controlling charge passage in the channel between the source 202 and drain 204 regions. Electrodes 207 are also shown as connected respectively to the source 202 and drain 204 regions. In this example the upper surface of electrodes 207 reside on the upper surface of the same dielectric layer 107 which used for the upper cladding of waveguide core 105. Since PSG and BPSG are commonly used insulating materials for gate isolation and interlayer dielectric metallization in the fabrication of CMOS integrated circuits, side and upper cladding 107 may be formed of these materials.

Although embodiments described above utilize a bare silicon substrate 101, it is also possible to form the embodiments using the upper silicon layer of a silicon on insulator (SOI) substrate as the substrate on which the photonic crystal lower cladding 103 and corresponding waveguide are formed. Also, although photonic crystal 103 has been described with elements 109, 109' having a periodic (a) or quasi-periodic arrangement within substrate 101 other spacings can be used which provide a degree of disorder within the silicon substrate 101 sufficient to provide an average index of refraction for the photonic crystal 103 which is lower than that of the material of waveguide core 105. Also, although the crystalline epitaxial layer 114, 114' forming waveguide core 105 is shown as non-selectively grown, it can also alternatively be selectively grown in the desired cross-sectional shape of waveguide core 105.

While example embodiments have been described above they are not limiting of the invention as modifications can be made without departing from the spirit or scope of the invention. Accordingly, the invention is not limited by the drawings and accompanying description, but is only limited by the scope of the appended claims.

What is claimed is:
1. An integrated structure comprising:
a substrate comprising a layer of silicon;
an optical cladding formed over the substrate, the optical cladding comprising a plurality of spaced oxide elements separated by regions of crystalline silicon; and
a waveguide comprising a core formed as a continuous slab of core material over the optical cladding and in direct contact with the oxide elements and regions of crystalline silicon of the optical cladding.
2. The integrated structure as in claim 1, wherein the spaced oxide elements comprise silicon dioxide.
3. The integrated structure as in claim 1, wherein the core material is a semiconductor material.
4. The integrated structure as in claim 1, wherein the core material is crystalline silicon.
5. The integrated structure as in claim 1, wherein the spaced oxide elements cause the optical cladding to have an average index of refraction which is lower than an index of refraction of the core.
6. The integrated structure as in claim 1, wherein the waveguide further comprises additional optical cladding on the sides and upper surface of the core.
7. The integrated structure as in claim 6, wherein the additional cladding comprises an oxide material.
8. The integrated structure as in claim 7, wherein the oxide material comprises silicon dioxide, BPSG, PSG, or a combination thereof.
9. The integrated structure as in claim 1, wherein the optical cladding comprises a photonic crystal.
10. The integrated structure as in claim 1, wherein the plurality of spaced oxide elements are spaced periodically or quasi-periodically.
11. The integrated structure as in claim 1, further comprising an electronic device integrated on the substrate.
12. The integrated structure as in claim 1, wherein the optical cladding forms a Bragg reflector.
13. The integrated structure as in claim 1, wherein the core has a height (h) and a width (w), where w>3h.
14. An integrated structure comprising an optical waveguide, the optical waveguide including:
a lower cladding formed as a photonic crystal over a silicon layer of a substrate, wherein the photonic crystal comprises spaced oxide elements separated by regions of crystalline silicon,
a core formed of a continuous region of epitaxial crystalline silicon formed over the lower cladding and in direct contact with the oxide elements and regions of crystalline silicon of the lower cladding, and
an oxide cladding formed on the sides and over the core.
15. The integrated structure of claim 14, wherein the spaced oxide elements comprise silicon dioxide.
16. The integrated structure as in claim 14, wherein the plurality of spaced oxide elements are spaced periodically or quasi-periodically.

17. The integrated structure of claim 14, further comprising an electronic device integrated on the substrate.

18. The integrated structure of claim 14, wherein the optical waveguide has a cross-sectional width (w) and height (h) wherein w>3h.

19. A method of forming an integrated structure comprising:
   forming a photonic crystal on a silicon layer of a substrate by positioning spaced oxide elements alternating with regions of crystalline silicon over the substrate, and
   forming a photonic device having a waveguide over the photonic crystal such that the photonic crystal serves as a lower cladding for the waveguide, wherein the waveguide comprises a core including a continuous slab of core material formed over the lower cladding such that the core is in direct contact with the oxide elements and regions of crystalline silicon of the lower cladding.

20. A method as in claim 19, further comprising forming an electronic device on the substrate.

* * * * *